(12) United States Patent
Arakawa

(10) Patent No.: US 10,718,704 B2
(45) Date of Patent: Jul. 21, 2020

(54) RUBBER ADHESION TEST METHOD AND RUBBER ADHESION TEST SYSTEM

(71) Applicant: TOYO TIRE & RUBBER CO., LTD., Itami-shi, Hyogo (JP)

(72) Inventor: Koji Arakawa, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 123 days.

(21) Appl. No.: 16/102,944

(22) Filed: Aug. 14, 2018

(65) Prior Publication Data

US 2019/0079001 A1   Mar. 14, 2019

(30) Foreign Application Priority Data

Sep. 8, 2017   (JP) ................... 2017-173054

(51) Int. Cl.
*G01M 17/02* (2006.01)
*G01N 19/04* (2006.01)
*G01N 19/02* (2006.01)

(52) U.S. Cl.
CPC ............ *G01N 19/04* (2013.01); *G01M 17/02* (2013.01); *G01N 19/02* (2013.01)

(58) Field of Classification Search
CPC ............................. G01M 17/02; G01N 19/04
See application file for complete search history.

(56) References Cited

U.S. PATENT DOCUMENTS

2012/0123700 A1\* 5/2012 Tsaur ................. G01N 19/04
702/41
2016/0258862 A1\* 9/2016 Shin ................... G01M 1/00

FOREIGN PATENT DOCUMENTS

| CN | 105445183 A | \* | 3/2016 | |
| CN | 105842163 A | \* | 8/2016 | |
| CN | 206497021 U | \* | 9/2017 | |
| CN | 207908337 U | \* | 9/2018 | |
| JP | 2009210463 A | \* | 9/2009 | |
| JP | 2016-170138 A | | 9/2016 | |
| KR | 100189650 B1 | \* | 6/1999 | |
| KR | 20150138603 A | \* | 12/2015 | |
| WO | WO-2018071995 A1 | \* | 4/2018 | ............ G01N 29/04 |

\* cited by examiner

*Primary Examiner* — Andre J Allen
(74) *Attorney, Agent, or Firm* — Westerman, Hattori, Daniels & Adrian, LLP

(57) ABSTRACT

A rubber adhesion test method in accordance with the present embodiment has step(s) in which rubber test member is pressed against prescribed road surface for a prescribed contact time and is thereafter pulled away therefrom, the pulling force acting thereon when this is pulled away therefrom being measured, this being performed a plurality of times, with the contact time being varied each time, and step(s) in which a relational expression relating adhesive force and contact time in correspondence to pulling force is derived based on the results of the plurality of measurements.

15 Claims, 5 Drawing Sheets

RUBBER ADHESION TEST METHOD AND RUBBER ADHESION TEST SYSTEM

BACKGROUND OF THE INVENTION

Field of the Invention

The present disclosure relates to a rubber adhesion test method and rubber adhesion test system.

Description of the Related Art

Friction of rubber used in tires and the like can be generally categorized as being either adhesive (sticky) friction (adhesion) or deformation-loss-producing fiction (hysteresis loss). Deformation-loss-producing friction is the loss of energy that results from deformation of rubber due to contact with the road surface and can be evaluated by means of tan δ. The adhesive frictional force is the shear force necessary to pull the rubber away from the road surface when these have bonded following contact therebetween, and is thought to depend on adhesive force and real contact area. For improvement of tribological performance, it is necessary to properly evaluate not only rubber hysteresis loss but also adhesive friction.

As a method of evaluating adhesive friction of rubber, at Japanese Patent Application Publication Kokai No. 2016-170138, a small probe is pressed against and then pulled away from the surface of a rubber test member to be tested, the maximum pulling force when this is pulled away therefrom is measured, the maximum pulling force is converted into adhesive force per unit area, and the evaluated value of adhesive fiction is calculated from the adhesive force.

However, with the method described at the foregoing publication, because a small probe is used, it is possible to evaluate only microscale adhesive forces, and as the difference depending on location is large, the accuracy thereof is thought to be low. Furthermore, although adhesive forces are susceptible to the influence of variation in real contact area, no consideration is made for variation in real contact area at the foregoing measurement method. Moreover, because variation in the time during which the probe is pressed thereagainst causes variation in real contact area due to rubber relaxation characteristics, it is necessary to accurately control the time during which the probe is pressed thereagainst.

SUMMARY OF INVENTION

The present disclosure was conceived in view of such problems, it being an object thereof to provide a rubber adhesion test method and a rubber adhesion test system that take into consideration variation in real contact area.

To solve the foregoing problem, the present disclosure employs means as described below.

In other words, according to the present disclosure, there is provided a rubber adhesion test method comprising:

a step in which a rubber test member is pressed against a prescribed road surface for a prescribed contact time and is thereafter pulled away therefrom, a pulling force acting thereon when this is pulled away therefrom being measured, this being performed a plurality of times with the contact time being varied each time; and a step in which a relational expression relating adhesive force and the contact time in correspondence to the pulling force is derived based on results of the plurality of measurements.

Thus, because rubber test member being tested is pressed against road surface and is pulled away therefrom, as compared with the situation in which a probe that is smaller than rubber test member is employed, it is possible to carry out evaluation of adhesive force with respect to the entire rubber test member, and it is possible to carry out evaluation of adhesive force with high accuracy.

Moreover, because, in deriving a relational expression relating adhesive force and contact time in correspondence to pulling force, measurement is carried out a plurality of times, with the contact time being varied each time, it is possible to carry out evaluation of adhesive friction in such fashion that variation in real contact area as a function of contact time is taken into consideration.

DETAILED DESCRIPTION OF THE PREFERRED EMBODIMENTS

Figure 1:
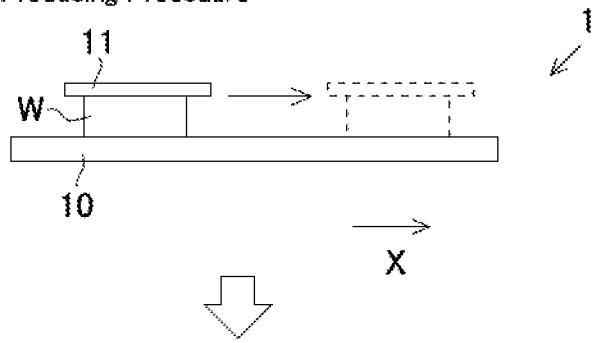
FIG. 1 Schematic diagram showing rubber test method and test system of the present disclosure.
Figure 1:
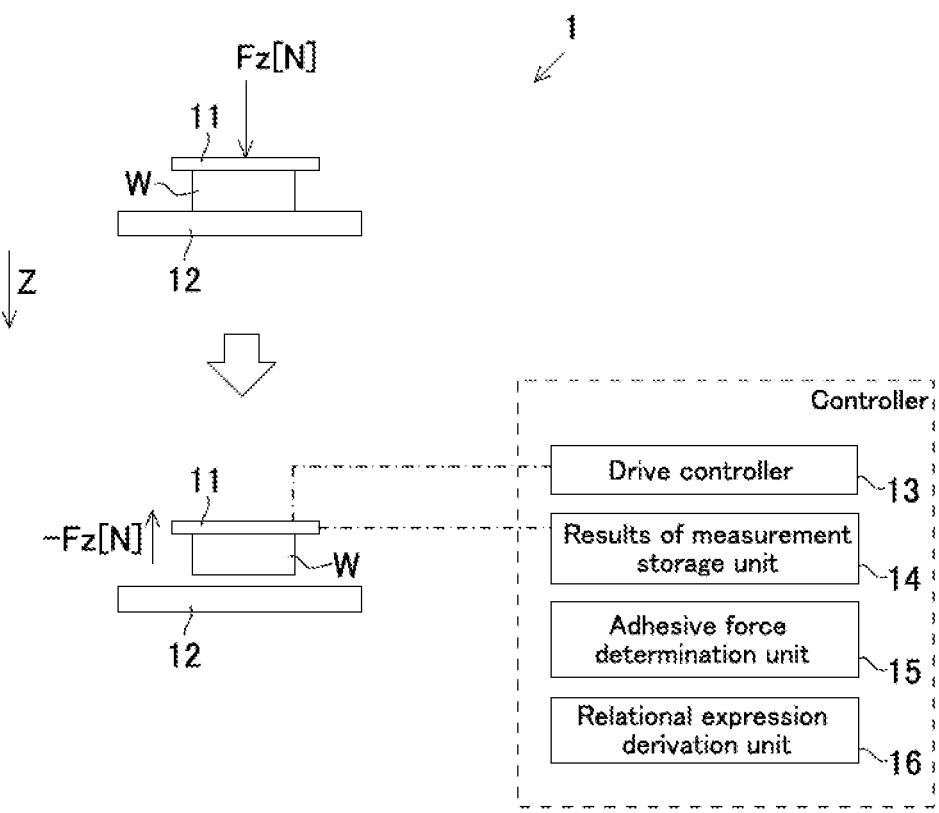

Below, an embodiment in accordance with the present disclosure is described with reference to the drawings.

A rubber adhesion test method employs rubber test apparatus 1. Rubber test apparatus 1 is made up of block-like rubber test member W and planar simulated road surface 12 which are capable of relative movement in at least two directions (the X direction and the Y direction). For this purpose, motor(s) or other such actuator(s) may be used to implement adhesion measuring operations in which rubber test member W is pressed against simulated road surface 12 and is thereafter pulled away therefrom, and friction-producing operations in which rubber test member W is made to move in sliding fashion in the road surface direction (X direction) as it is pressed against road surface 10. Rubber test member W is attached to base 11, and load cell(s) or other such pressure sensor(s) for detection of force in three mutually orthogonal directions are attached to base 11. While the present embodiment is constituted such that simulated road surface 12 is stationary and base 11 moves, a constitution may also be adopted in which simulated road surface 12 is instead made to move.

A rubber adhesion test system in accordance with the present disclosure has the foregoing rubber test apparatus 1; results of measurement storage unit 14 which stores results of measurement carried out by rubber test apparatus 1; adhesive force determination unit 15 which determines adhesive force based on results of measurement; and relational expression derivation unit 16 which derives a relational expression relating adhesive force and contact time. A controller for control of rubber test apparatus 1 is provided with drive controller 13 which controls driving of rubber test apparatus 1. While results of measurement storage unit 14, adhesive force determination unit 15, and relational expression derivation unit 16 are provided at the controller in the present embodiment, there is no limitation with respect thereto. At least one among results of measurement storage unit 14, adhesive force determination unit 15, and relational expression derivation unit 16 may be installed at different apparatus(es). Note that while a computer is employed to form the system of the present embodiment, it is also possible for a human being to operate the rubber test apparatus and measure pulling force, and for a human being to carry out the processing performed at adhesive force determination unit 15 and relational expression derivation unit 16.

An example of a rubber adhesion test method employing the foregoing system will now be described with reference to FIG. 1 and FIG. 2.

First, at step ST1, rubber test apparatus 1 carries out a friction-producing procedure. At the friction-producing procedure, the entire surface at one face of rubber test member W is made to move in sliding fashion a prescribed number of times in the road surface direction (X direction) as it is pressed with a prescribed load against road surface 10. While road surface 10 in the present embodiment is dry, it is also possible to carry out friction-producing operations on a wet road surface, it being preferred to reproduce the conditions of the road surface being evaluated. As a result of performing friction-producing operations with rubber test member W on road surface 10, the contact surface of rubber test member W undergoes a change in properties due to heat, forming an adhesive layer and increasing the adhesive force thereat. In the present embodiment, test apparatus 1 was made to engage in sliding motion 15 times at 300 kPa on a dry road surface. The load and the number of times that sliding motion is carried out may be varied as appropriate. Moreover, the friction-producing procedure may be omitted. As the road surface, an actual road surface, a test road surface, a road surface treated so as to be planar or irregular, and so forth may be cited as examples.

Next, at step ST2, rubber test apparatus 1 carries out an adhesion measuring procedure. At the adhesion measuring procedure, rubber test member W is pressed against prescribed road surface 12 for a prescribed contact time and is thereafter pulled away therefrom, the pulling force acting thereon when this is pulled away therefrom being measured. As the prescribed road surface, an actual road surface, a test road surface, a road surface treated so as to be planar or irregular, and so forth may be cited as examples. This may be carried out under either dry or wet conditions. In accordance with the present embodiment, a metal plate was used. The prescribed road surface used at the adhesion measuring procedure and the road surface used at the friction-producing procedure may be the same or they may be different.

Figure 3:
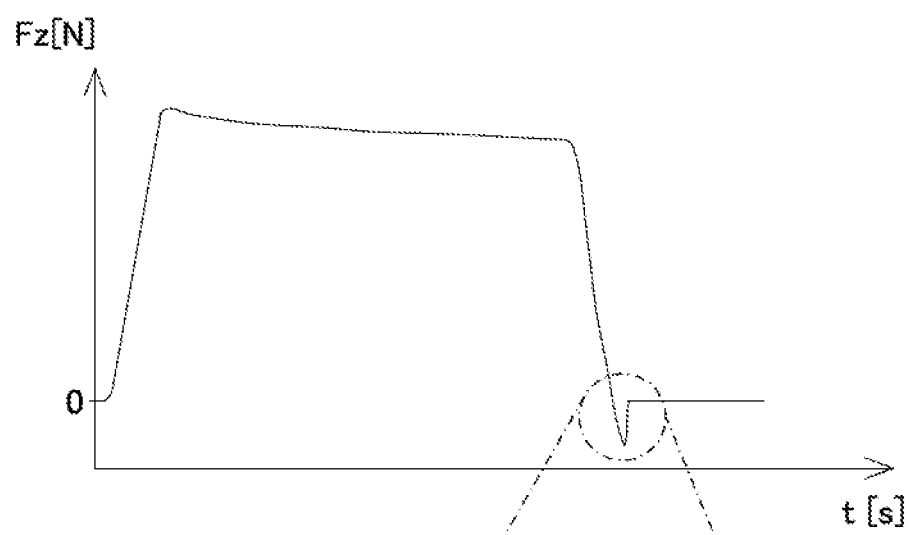
FIG. 3 Drawing showing pressure measured when pressing against and pulling away from a rubber test member.
Figure 3:
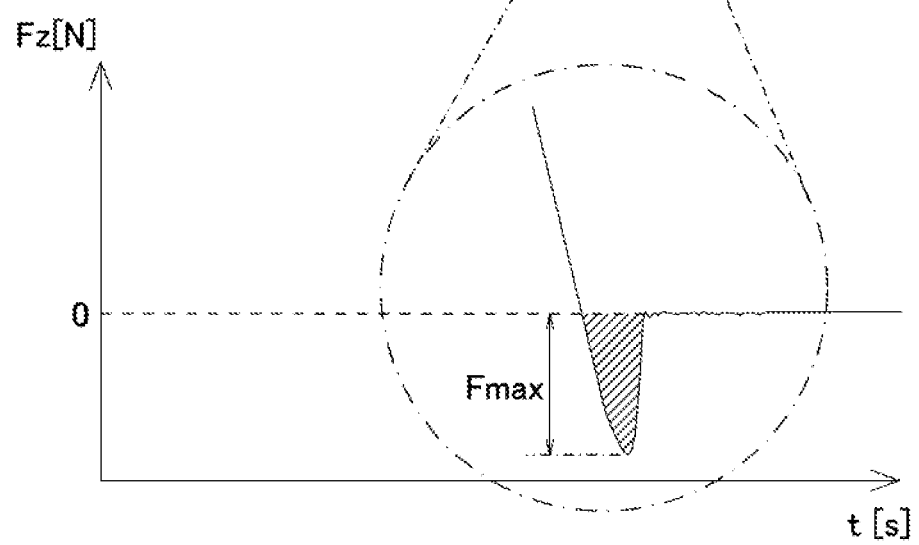

Next, at step ST3, based on the pulling force data that was measured, adhesive force is determined in correspondence to pulling force. At FIG. 3, the vertical axis indicates the force Fz (in units of N=Newtons) which was detected, and the horizontal axis indicates elapsed time t (in units of s=seconds). For example, as shown in FIG. 3, the maximum value $F_{max}$ of the pulling force that acts when rubber test member W is pulled away from the prescribed road surface 12 might be taken to be the adhesive force. Where this is the case, it will be possible to calculate adhesive force as a result of simple processing.

Furthermore, as indicated by diagonal hatching at same drawing, the value of the time integral of pulling force that acts when rubber test member W is pulled away from the prescribed road surface 12 might be taken to be the adhesive force. The values of pulling force which are measured are integrated over time with the line Fz=0 serving as baseline. The value obtained upon integrating this over time corresponds to the area of the region indicated by diagonal hatching in the drawing. Where this is the case, because this reflects not only the maximum value $F_{max}$ of the pulling force but also the change thereof as a function of time, it will tend to be less susceptible to the influence of noise, as a result of which precision will be improved. Note that as the direction in which rubber test member W is pressed against road surface 12 is the Z direction, the force with which this is pressed thereagainst being detected as a positive value for force Fz, pulling force is detected as a negative value for Fz.

Measurement of pulling force at step ST2 is carried out a plurality of times (N times), the contact time being different each time. While it is sufficient that N be a natural number not less than two, higher numbers are preferred. While contact time was 0 second to 10 seconds in the present embodiment, there is no limitation with respect thereto, various modifications with respect thereto being possible. Note that determination of adhesive force at step ST3 may be carried out each time that pulling force is measured, or may be carried out all at once after all measurements have been completed.

Figure 4A:
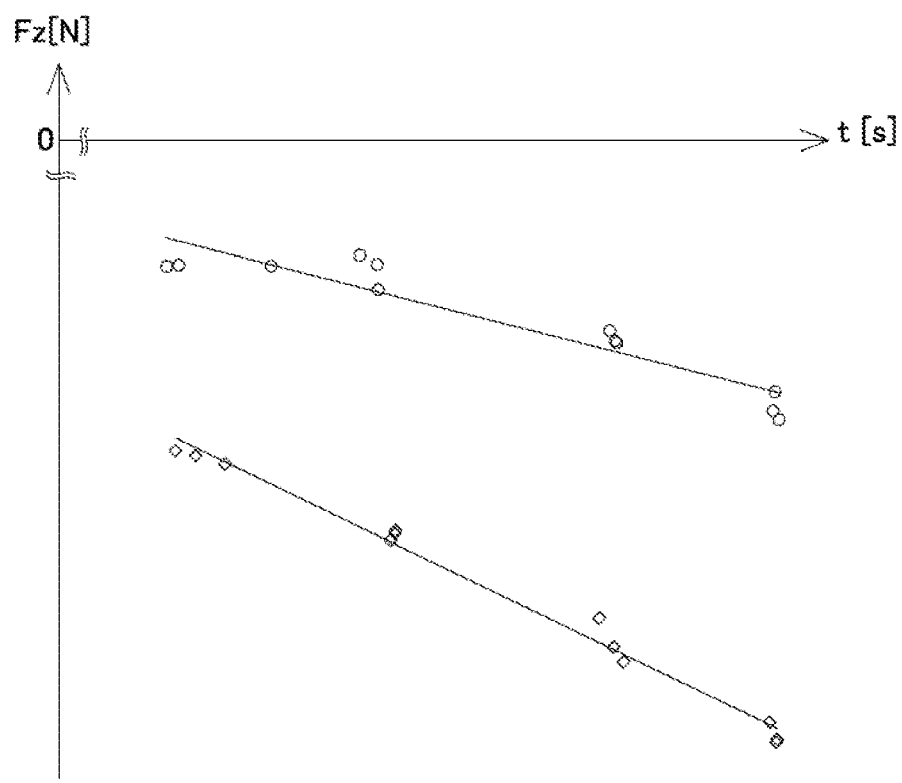
FIG. 4A Drawing showing relationship between contact time and maximum value for pulling force.
Figure 4B:
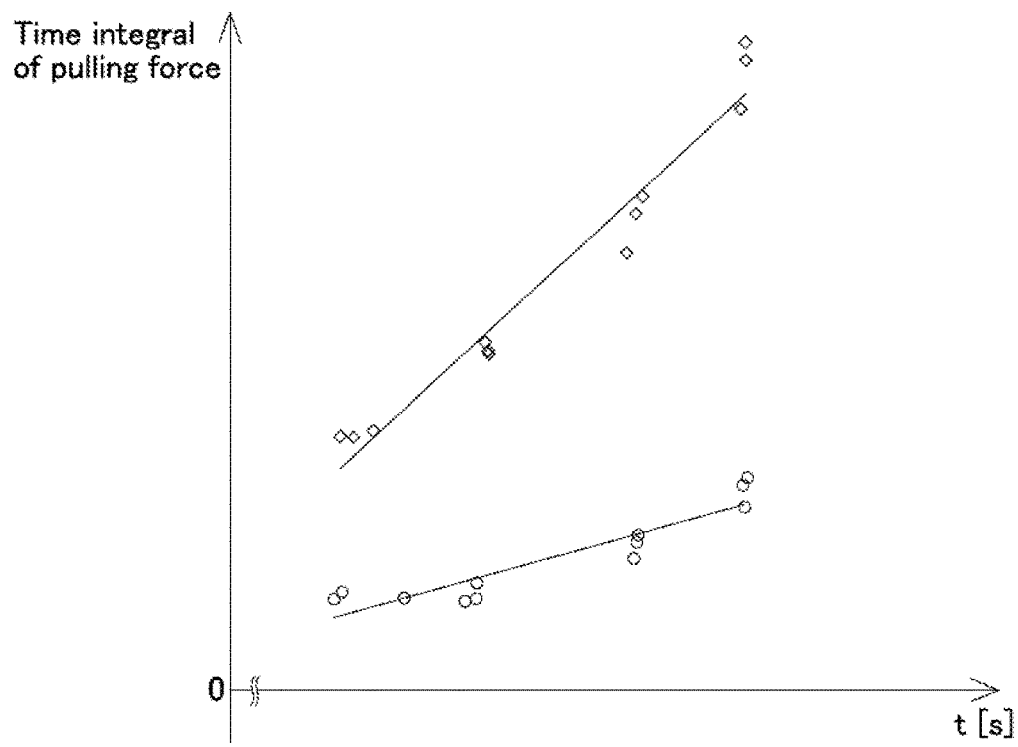
FIG. 4B Drawing showing relationship between contact time and time integral of pulling force.

After all measurements have been completed (YES at step ST4), at step ST5, a relational expression relating adhesive force and contact time in correspondence to pulling force is derived based on the results of the plurality of measurements. More specifically, as shown in FIG. 4A and FIG. 4B, results of each measurement might be graphed such that adhesive force is plotted on the vertical axis (y-axis) and contact time t is plotted on the horizontal axis (x-axis), and an approximation formula might be used to approximate the respective graphed points and derive a relational expression therefrom. In the present embodiment, an approximation formula obtained using logarithmic approximation was employed as the relational expression. $y=\alpha \ln(x)-\beta$ was employed. $\alpha$ and $\beta$ are coefficients. The least-squares method was employed as approximation method. Because adhesive force varies logarithmically in correspondence to contact time, logarithmic approximation is preferred. However, there is no limitation with respect to logarithmic approximation, it being possible, for example, to employ linear approximation or polynomial approximation.

FIG. 4A is a drawing showing relationship between contact time t and adhesive force in a situation in which the adhesive force is taken to be the maximum value $F_{max}$ of the pulling force. In the drawing, circles indicate measurements results for rubber having a particular composition, and diamonds indicate measurements results for robber having a different composition. In the drawing, the lines indicate logarithmic approximation formulas. FIG. 4B is a drawing showing relationship between contact time t and adhesive force in a situation in which the adhesive force is taken to be the time integral of pulling force. It is clear that the same trend as at FIG. 4A is apparent here.

While the same speed was used during all measurements made at the foregoing embodiment when rubber test member W was pressed against road surface 12 and when it was pulled away therefrom, various modifications with respect thereto are possible. If pulling force is measured a plurality of times, with the speed at the time that rubber test member W is pressed thereagainst, and the speed at the time that this is pulled away therefrom, being varied each time, it will be possible to perform evaluation in similar fashion as when rubber contact time is varied.

Variations

Figure 2:
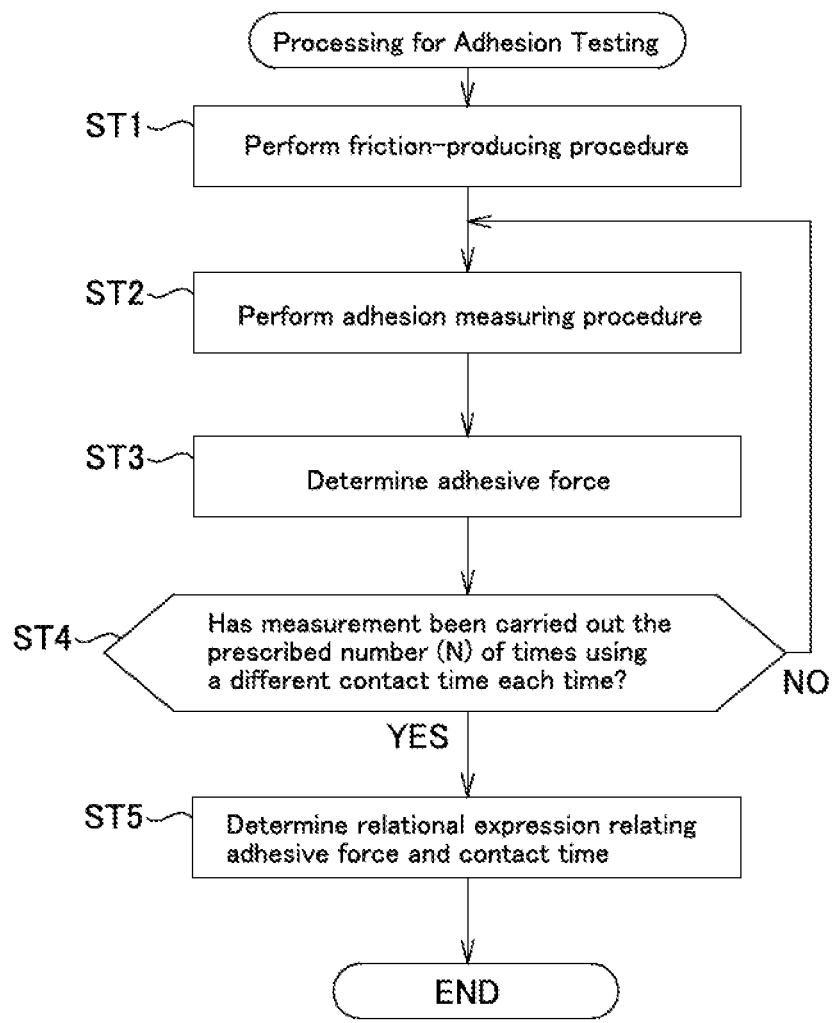
FIG. 2 Flowchart showing rubber adhesion test method of the present disclosure.
Figure 5:
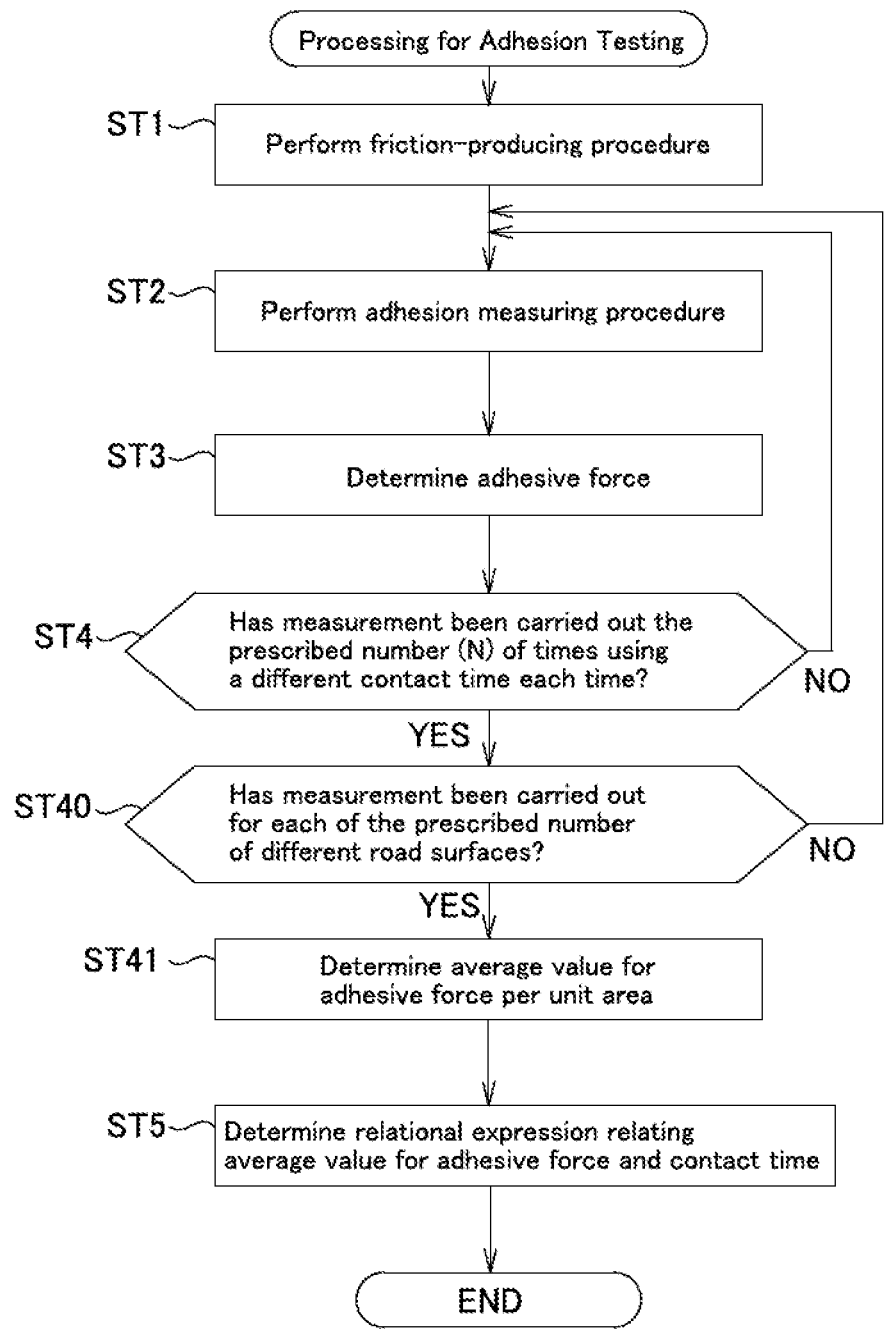
FIG. 5 Flowchart showing a variation on the rubber adhesion test method.

Whereas at the example shown in FIG. 2 the road surface contacted by rubber test member W was the same, a procedure may be carried out as indicated at FIG. 5. That is, steps (ST2, 3, and 4) in which pulling force is measured a plurality of times, with contact time being varied each time, might be carried out for a plurality of different road surfaces (step ST40), and a step might be further included in which an average value is found for adhesive force per unit area as determined based on contact area and measured pulling force (step ST41), and a relational expression might be derived which relates the average value for adhesive force per unit area and contact time (step ST5).

At step ST40, where it is said that measurement of pulling force might be carried out for a plurality of different road surfaces, this may be taken to mean that the entire road surface is replaced with a different road surface, or it may be taken to mean that only that portion of the road surface at which contact occurs is replaced therewith.

At step ST41, as an example of what is meant by determination of adhesive force per unit area, pulling force for a particular contact time and a particular road surface might be measured, and the pulling force (adhesive force) per unit area might be calculated from the pulling force and contact area at that time, and pulling force for the same contact time but with a different road surface might then be measured, and the pulling force (adhesive force) per unit area might be calculated from the pulling force and contact area at that time. As another method for doing this, it is possible to create a graph in which contact area is plotted on the horizontal axis and adhesive force is plotted on the vertical axis, and carry out determination of adhesive force per unit area by taking this to be the slope which can be derived from the graph.

At step ST5, a relational expression is derived which relates the average value for adhesive force and contact time. This is the same as at the example of FIG. 2.

As described above, a rubber adhesion test method in accordance with the present embodiment has step(s) (ST2 and ST4) in which rubber test member W is pressed against prescribed road surface 12 for a prescribed contact time and is thereafter pulled away therefrom, the pulling force acting thereon when this is pulled away therefrom being measured, this being performed a plurality of times, with the contact time being varied each time, and step(s) (ST5) in which a relational expression relating adhesive force and contact time in correspondence to pulling force is derived based on the results of the plurality of measurements.

Thus, because rubber test member W being tested is pressed against road surface 12 and is pulled away therefrom, as compared with the situation in which a probe that is smaller than rubber test member W is employed, it is possible to carry out evaluation of adhesive force with respect to the entire rubber test member W, and it is possible to carry out evaluation of adhesive force with high accuracy.

Moreover, because, in deriving a relational expression relating adhesive force and contact time in correspondence to pulling force, measurement is carried out a plurality of times, with the contact time being varied each time, it is possible to carry out evaluation of adhesive friction in such fashion that variation in real contact area as a function of contact time is taken into consideration.

In accordance with the present embodiment, the relational expression might be an approximation formula obtained using logarithmic approximation.

Where this is the case, because adhesive force varies logarithmically in correspondence to contact time, it will be possible to improve reproducibility of the relational expression relating adhesive force and the contact time corresponding thereto.

In accordance with the present embodiment, the maximum value $F_{max}$ of the pulling force that acts when rubber test member W is pulled away from the prescribed road 12 surface might be taken to be the adhesive force.

Where this is the case, it will be possible to calculate adhesive force as a result of simple processing.

In accordance with the present embodiment, the value of the time integral of the pulling force that acted when rubber test member W is pulled away from the prescribed road 12 surface might be taken to be the adhesive force.

Where this is the case, because this will reflect not only the maximum value of the pulling force but also the change thereof as a function of time, it will tend to be less susceptible to the influence of noise, as a result of which precision will be improved.

In accordance with the present embodiment, measurement of pulling force might be carried out a plurality of times, the speed with which rubber test member W is pulled away from the prescribed road surface 12 being varied each time.

Where this is the case, it will be possible to perform evaluation in similar fashion as when rubber contact time is varied.

In accordance with the present embodiment, prior to measurement of pulling force, a friction-producing procedure might be carried out in which rubber test member W is made to move in sliding fashion a prescribed number of times in the road surface direction as it is pressed with a prescribed load against road surface 10.

Where this is the case, it will be possible to reproduce the rubber surface as it actually exists at a tire during driving, and it will be possible to improve the accuracy with which evaluation of adhesive friction is carried out.

In the example of FIG. 5, steps (ST2, 3, and 4) in which measurement of pulling force was carried out a plurality of times, contact time being varied each time, were carried out for a plurality of different road surfaces (ST40). Moreover, a step (step ST41) was further included in which an average value was found for adhesive force per unit area as determined based on contact area and measured pulling force. At step ST5 in which a relational expression was derived, a relational expression relating the average value for adhesive force per unit area and contact time was derived.

For example, where size of rubber test member W varies, there are situations in which it is impossible to cause contact to occur at the same location on the road surface, and where the road surface has irregularities, the portion thereof at which contact occurs will vary, making comparison impossible. But by expressing this in terms of adhesive force per unit area, comparison is made possible due to the fact that adhesive forces are employed in a form which takes contact area into consideration.

A rubber adhesion test system in accordance with the present embodiment has drive controller 13 which controls test apparatus 1 so as to cause rubber test member W to be pressed against prescribed road surface 12 for a prescribed contact time and to thereafter be pulled away therefrom, the pulling force acting thereon when this is pulled away therefrom being measured, this being performed a plurality of times, with the contact time being varied each time, and relational expression derivation unit 16 which derives a relational expression relating adhesive force and contact time in correspondence to pulling force based on the results of the plurality of measurements.

Use of this system will make it possible to obtain the actions and effects provided by the foregoing method.

In accordance with the present embodiment, test apparatus 1 has base 11 and prescribed road surface 12, being constituted such that prescribed road surface 12 and rubber test member W which is attached to base 11 are capable of relative movement in at least two directions (the X direction and the Y direction).

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

What is claimed is:

1. A rubber adhesion test method comprising:
a step in which a rubber test member is pressed against a prescribed road surface for a prescribed contact time and is thereafter pulled away therefrom, a pulling force acting thereon when this is pulled away therefrom being measured, this being performed a first plurality of times with the contact time being varied each time; and
a step in which a relational expression relating adhesive force and the contact time in correspondence to the pulling force is derived based on results of the plurality of measurements.

2. The method according to claim 1 wherein the relational expression is an approximation formula obtained using logarithmic approximation.

3. The method according to claim 1 wherein a maximum value of the pulling force that acts when the rubber test member is pulled away from the prescribed road surface is taken to be the adhesive force.

4. The method according to claim 1 wherein a value of a time integral of the pulling force that acts when the rubber test member is pulled away from the prescribed road surface is taken to be the adhesive force.

5. The method according to claim 1 wherein measurement of the pulling force is carried out a second plurality of times, a speed with which the rubber test member is pressed against the prescribed road surface, and a speed with which the rubber test member is pulled away from the prescribed road surface, being varied each time.

6. The method according to claim 1 wherein prior to the measurement of the pulling force, a friction-producing procedure is carried out in which the rubber test member is made to move in sliding fashion a prescribed number of times in a road surface direction as the rubber test member is pressed with a prescribed load against the road surface.

7. The method according to claim 1 wherein: the prescribed road surface is one of a plurality of different road surfaces, and
the step in which the pulling force is measured the first plurality of times, with the contact time being varied each time, is carried out for the plurality of different road surfaces;
the method further comprises a step in which an average value is found for adhesive force per unit area as determined based on contact area and the measured pulling force; and
at the step in which the relational expression is derived, the relational expression that is derived relates the average value for adhesive force per unit area and the contact time.

8. A rubber adhesion test system comprising:
a drive controller that controls a test apparatus so as to cause a rubber test member to be pressed against a prescribed road surface for a prescribed contact time and to thereafter be pulled away therefrom, a pulling force acting thereon when this is pulled away therefrom being measured, this being performed a first plurality of times with the contact time being varied each time; and
a relational expression derivation unit that derives a relational expression relating adhesive force and the contact time in correspondence to the pulling force based on results of the plurality of measurements.

9. The system according to claim 8 wherein
the test apparatus comprises a base and the prescribed road surface; and
the test apparatus is constituted so as to permit relative movement in at least two directions between the prescribed road surface and the rubber test member which is attached to the base.

10. The system according to claim 8 wherein the relational expression is an approximation formula obtained using logarithmic approximation.

11. The system according to claim 8 wherein the relational expression derivation unit is constituted such that a maximum value of the pulling force that acts when the rubber test member is pulled away from the prescribed road surface is taken to be the adhesive force.

12. The system according to claim 8 wherein the relational expression derivation unit is constituted such that a value of a time integral of the pulling force that acts when the rubber test member is pulled away from the prescribed road surface is taken to be the adhesive force.

13. The system according to claim 8 wherein the drive controller is constituted such that measurement of the pulling force is carried out a second plurality of times, a speed with which the rubber test member is pressed against the prescribed road surface, and a speed with which the rubber test member is pulled away therefrom, being varied each time.

14. The system according to claim 8 wherein, prior to the measurement of the pulling force, a friction-producing procedure is carried out in which the rubber test member is made to move in sliding fashion a prescribed number of times in a road surface direction as the rubber test member is pressed with a prescribed load against the road surface.

15. The system according to claim 8 wherein: the prescribed road surface is one of a plurality of different road surfaces, and
the step in which the pulling force is measured the first plurality of times, with the contact time being varied each time, is carried out for the plurality of different road surfaces;
the system is constituted such that an average value is found for adhesive force per unit area as determined based on contact area and the measured pulling force; and
the relational expression that is derived by the relational expression derivation unit relates the average value for adhesive force per unit area and the contact time.

* * * * *